(12) United States Patent
Cornelissen et al.

(10) Patent No.: US 9,434,546 B2
(45) Date of Patent: Sep. 6, 2016

(54) END DRIVE FOR A CONVEYOR, CONVEYOR PROVIDED WITH AN END DRIVE, AND DRIVE GEAR FOR AN END DRIVE (71) Applicant: REXNORD FLATTOP EUROPE B.V., 's-Gravenzande (NL)

(72) Inventors: Leonardus Adrians Catharinus Cornelissen, 's-Gravenzande (NL); Cornelis Hendrik Mijndert Menke, 's-Gravenzande (NL)

(73) Assignee: REXNORD FLATTOP EUROPE B.V., 'S-Gravenzande (NL)

( * ) Notice: Subject to any disclaimer, the term of this patent is extended or adjusted under 35 U.S.C. 154(b) by 0 days.

(21) Appl. No.: 14/438,902

(22) PCT Filed: Oct. 29, 2013

(86) PCT No.: PCT/NL2013/050763
§ 371 (c)(1),
(2) Date: Apr. 28, 2015

(87) PCT Pub. No.: WO2014/069997
PCT Pub. Date: May 8, 2014

(65) Prior Publication Data
US 2015/0336744 A1 Nov. 26, 2015

(30) Foreign Application Priority Data

Oct. 29, 2012 (NL) .................................... 2009721

(51) Int. Cl.
*B65G 17/08* (2006.01)
*B65G 23/06* (2006.01)

(52) U.S. Cl.
CPC ............. *B65G 17/086* (2013.01); *B65G 17/08* (2013.01); *B65G 23/06* (2013.01)

(58) Field of Classification Search
CPC ..... B65G 17/08; B65G 17/086; B65G 23/06
USPC ........................................ 198/831, 832, 834
See application file for complete search history.

(56) References Cited

U.S. PATENT DOCUMENTS 3,991,876 A * 11/1976 Schmidt, Sr. ........ B65G 17/063
198/831
4,179,026 A * 12/1979 de Vries ................. B65G 15/02
198/831

(Continued)

FOREIGN PATENT DOCUMENTS

DE 10 2006 025520 A1 12/2007
FR 2 881 410 A1 8/2006
WO 2011/067737 A1 6/2001

OTHER PUBLICATIONS

International Search Reportand Written Opinion under date of mailing of Feb. 5, 2014 in connection with PCT/NL2013/050763.

*Primary Examiner* — Douglas Hess
(74) *Attorney, Agent, or Firm* — Quarles & Brady LLP (57) ABSTRACT

End drive for a conveyor, comprising a conveying track (6) for, during use, guiding a conveying part of a modular conveyor mat (2) of the side-flexing type, a return guide (10) extending at a distance along the conveying part for return guidance of a return part of the conveyor mat, and a gear drive (16) located between the conveying track and the return guide for, through engagement on the conveyor mat, drivingly having the conveyor mat round from the conveying track to the return guide. The conveying track and the return guide comprise a bend segment where the conveying part and the return part of the conveyor mat, respectively, are guided in their planes through a bend. The gear drive drives the conveyor mat only in an area corresponding to the outer side of the bend segment where successive modules of the conveyor mat are substantially pitched, and leaves the conveyor mat free in an area corresponding to the inner side of the bend segment where successive modules of the conveyor mat are at least partly slid into each other. The return guide comprises a guiding envelope (E).

14 Claims, 7 Drawing Sheets

(56) References Cited

U.S. PATENT DOCUMENTS

| | | | | |
|---|---|---|---|---|
| 4,887,708 A * | 12/1989 | Brown | B65G 15/02 198/831 |
| 5,127,515 A * | 7/1992 | Damkjaer | B65G 17/086 198/831 |
| 5,332,082 A * | 7/1994 | Sommerfield | B65G 15/02 198/831 |
| 5,573,105 A * | 11/1996 | Palmaer | B65G 17/086 198/845 |
| 5,669,483 A * | 9/1997 | Nolan | B65G 21/14 198/812 |
| 6,971,510 B2 * | 12/2005 | Cotter | B65G 15/02 198/606 |
| 7,497,326 B2 * | 3/2009 | McGuire | B65G 15/00 198/831 |
| 7,546,916 B2 * | 6/2009 | Jenny | B65G 15/02 198/831 |
| 7,832,549 B2 * | 11/2010 | Honeycutt | B65G 15/02 198/831 |
| 8,322,519 B2 * | 12/2012 | Kuhn | B65G 15/02 198/831 |
| 8,459,444 B2 * | 6/2013 | Perreard | B65G 21/16 198/831 |
| 8,464,862 B2 * | 6/2013 | Honeycutt | B65G 15/08 198/822 |
| 8,763,789 B2 * | 7/2014 | Wallace | B65G 13/00 198/787 |
| 8,997,976 B2 * | 4/2015 | Torra | B65G 15/00 198/837 |
| 9,016,467 B2 * | 4/2015 | Bettati | B65G 17/086 198/850 |
| 9,073,696 B2 * | 7/2015 | Hagmaier | B65G 15/02 |
| 9,120,628 B2 * | 9/2015 | Ventz | B65G 15/02 |

\* cited by examiner

END DRIVE FOR A CONVEYOR, CONVEYOR PROVIDED WITH AN END DRIVE, AND DRIVE GEAR FOR AN END DRIVE

CROSS-REFERENCE TO RELATED APPLICATIONS

This application represents the national stage entry of PCT International Application No. PCT/NL2013/050763 filed Oct. 29, 2013, which claims the benefit of Netherlands Patent Application No. 2009721 filed Oct. 29, 2012, the disclosures of which are hereby incorporated by reference in their entirety for all purposes.

The invention relates generally to conveyors, in particular to a conveyor with a conveying track which cooperates with a modular conveyor mat.

Conveyors with modular conveyor mats are generally known and are utilized for industrial conveyance, for instance conveyance of packagings through a production location. Such conveyors typically comprise a track with a conveyor mat which circulates between return elements located at the beginning and the end of the conveyor. In rounding a return element, the conveyor mat travels through a bend transversely to the plane of the conveying track. The conveyor mat is built up from rows of modules successive in the direction of movement, which are hingedly connected to each other. To that end, at their front sides and their rear sides, the modules have a series of coupling ends extending forward and rearward, respectively, which are spaced apart at mutual interspaces transversely to the direction of movement. The coupling ends of successive modules cooperate: in adjacent modules, coupling ends reach into interspaces, for instance like the interdigitating fingers of folded hands. The modules of successive rows are coupled with the aid of hinge pins which reach transversely to the direction of movement through hinge holes, which are provided in the cooperating coupling ends.

The return elements can be stationary, for instance a stationary tube whose outer surface forms a return surface, but can also be rotary. The return elements can engage the mat, as, for instance, a gear wheel, but can also be non-engaging, for instance a smooth return wheel. For the purpose of guiding the conveyor mat, the return elements are often designed as a set of rotatable gear wheels spaced apart at mutual interspaces transversely to the direction of movement, whose teeth engage the conveyor mat.

The drive of the conveyor mat is often taken care of by an end drive arranged at the end of the conveyor. The end drive comprises a gear drive, which is typically configured as a driven shaft having thereon a set of rotatable gear wheels spaced apart at mutual interspaces transversely to the direction of movement, whose teeth engage the conveyor mat.

To compensate for lengthwise expansion of the conveyor mat and to regulate the cooperation of the driven gear with the conveyor mat, in the known conveyors, in the end drive, in the first part of the conveyor mat's return part running back straight between the return elements, after the driven return elements, a catenary sag section is realized, in which the conveyor mat sags freely.

The conveyor can have a straight conveying path, but can also have a conveying path with one or more bends in the conveying surface. In such a case, use is made of a so called modular side-flexing mat, a conveyor mat where successive modules can pivot relative to each other in their plane, by sliding by their coupling ends into the interspaces at an angle. When travelling through a bend in the track, the pitch between successive modules on one of the longitudinal sides of the conveyor mat is reduced, so that the successive modules and hinge pins include an angle relative to each other. Such a side-flexing mat is generally known and is also called 'radius belt'. Depending on the design, the side flexing mat may be configured to slide-in on one or on both longitudinal sides, so that in addition to travelling straight, it can also travel to the left and/or the right.

In the known conveyors, with the end drive, the successive modules in the conveying track, after traveling through a bend in the track plane, are on the inside bend re-pitched again in a straight track section as a result of the tensile force in the mat, before rounding transversely to the track plane at the return elements. This is to ensure, among other things, that there is sufficient space on both sides of the conveyor mat for the gear wheels to engage the mat, to ensure that successive modules are parallel in rounding, and to ensure that catenary sag can be realized.

Although such a conveyor for cooperation with a modular side-flexing mat provides many advantages, it is sometimes a drawback in practice that at the end drive after the last bend, a straight track section follows before the mat rounds the return elements. The straight track section occupies space, which is rather avoided from a viewpoint of compactness and cost-effectiveness. Also, in practice, regularly situations occur where such space is not available. In view of this, in practice, conveyors have been developed with special conveyor mats that run in a bend continuously, in that successive modules include a fixed angle. Such conveyor mats in turn have as a drawback that the conveying track always runs in a curve with a fixed radius, and moreover cannot comprise a straight track section.

The object of the invention is to provide a conveyor for cooperation with a modular side-flexing mat with an end drive, whereby the conveyor mat after a bend in the plane of the conveying track can round transversely to the conveying track without intermediate straight run-out section.

To that end, the invention provides an end drive for a conveyor, comprising a conveying track for, during use, guiding a modular conveyor mat of the side-flexing type, a return guide extending at a distance along the conveying part for return guidance of a return part of the conveyor mat, and a gear drive located between the conveying track and the return guide for, through engagement of the conveyor mat, drivingly having the conveyor mat round from the conveying track to the return guide, wherein the conveying track and the return guide comprise a bend segment where the conveying part and the return part of the conveyor mat, respectively, are guided in their plane through a bend, wherein the gear drive drives the conveyor mat only in an area corresponding to the outer side of the bend segment where successive modules of the conveyor mat are substantially pitched, and leaves the conveyor mat free in an area corresponding to the inner side of the bend segment where successive modules of the conveyor mat are at least partly slid into each other, and wherein the return guide comprises a guiding envelope, linking up with the gear drive and extending along successive rows of modules, in which movement of the return part of the conveyor mat both sideways in the plane of the conveyor mat and transversely to the conveying plane is limited.

By configuring the gear drive such that it drives the conveyor mat in the area on the outer side of the bend while leaving the area on the inner side of the bend free, the area on the inner side of the conveyor mat does not first need to be pitched in a straight track section. The driving force can then be coupled in the area on the outer side of the mat, in or adjacent the area where in the bend the tensile force in the mat is transmitted. Surprisingly, it has been found that by having the rows of modules round freely in the area on the inner side of the mat, possible misalignment of the modules in rounding can be accommodated. By providing a guiding envelope in the return guide in which the conveyor mat is retained transversely to the plane of the conveyor mat, the straight sag section in the return part can be obviated. In particular, what can be counteracted in this manner, is that the mat leaves the gear wheel too soon and the gear wheel slips clear of the mat, and that the mat moves along with the gear wheel for too long and the mat doubles. During use, the guiding envelope comprises a compression zone in which successive modules of the conveyor mat, both in an area corresponding to the inner side of the bend and in the area on the outer side of the bend, can be slid into each other in a compression zone without the mat buckling. Successive modules of the mat can thus be pressed into each other over the entire width of the mat to compensate lengthwise expansion of the conveyor mat. Through use of the envelope, the mat can be pushed through the bend to return, without buckling. Thus, the conveyor can be free of a straight run-out section between the bend in the track and the return elements.

Within this context, the area corresponding to the inner side or outer side of the bend is intended to mean an area located in the bend or adjacent thereto in the direction of movement. Within this context, the outer side of the bend in the broadest sense is the area which, from the center of curvature, is located radially outwards in the outer half of the mat width. The area on the inner side of the bend is the area which, from the center of curvature, is located radially outwards in the inner half of the mat width. More particularly, the area on the outer side of the bend can comprise the outer 40% of the mat width, or specifically even the outer ⅓ or ¼ part of the mat width. The area on the inner side of the bend then is the inner 60% of the mat width, or the inner ⅔ or ¾ part of the mat width, respectively.

The guiding envelope involves an at least partly curved zone of the return guide, extending from the return wheel into the bend, in which sideways movement of the conveyor mat in the plane of the conveyor mat and upward and downward movement transverse to the conveying plane is limited. Owing to the construction of the conveyor mat from relatively rigid modules and hinge pins, there is no need to physically arrange a continuous guide surrounding the conveyor mat throughout the zone. In the direction of movement the unsupported length is less than the pitch of the module, for instance half the pitch or less, but transversely to the direction of movement the unsupported length can be greater than the dimension of a module. Transversely to the plane of the conveyor mat, the movement is preferably limited to a clearance of less than half the pitch of the module. The longitudinal edges of the conveyor mat are preferably held with a clearance of a few millimeters in continuous, U-shaped guiding channels, of a configuration curved in the direction of movement of the mat. The top and bottom surface of the mat are preferably supported by guides spaced apart at a mutual distance of, for instance, 10-30 centimeters transversely to the direction of movement, which guides also extend in the direction of movement, between which the mat is received with a few millimeters of clearance. The upper return guide cooperates with the bottom surface of the conveyor mat in the return guide, and extends along the gear wheel to near the '6 o'clock' position of the gear wheel, and counteracts the gear wheel carrying along the conveyor mat. The lower return guide cooperates with the conveyor mat top surface, facing down in the return guide, and extends in the plane of the gear wheel, to near the '6 o'clock' position, and preferably beyond that upwards along the circumference of the gear wheel, up to, for instance, the '3 o'clock' position.

By providing the conveyor in the area corresponding to the inner side of the bend with non-engaging return elements, for instance smooth return wheels spaced apart transversely to the direction of conveyance on the drive shaft of the gears, the conveyor can be supported in rounding adjacent the non-driven part. Also on either side of the driving gears, such smooth return wheels can be arranged.

The gear drive can comprise several toothed rings spaced apart transversely to the direction of movement at successive interspaces between the hinge loops of the conveyor mat. Elegantly, three or more of such toothed rings are arranged. The teeth of adjacent toothed rings are then preferably arranged at the same angular positions. By arranging the three or more toothed rings on a common gear wheel the drive can be realized compactly and efficiently, and relative positioning of the toothed rings can be facilitated. Supplemental to the toothed rings, supplementary transverse force absorbing elements can be arranged to absorb the force exerted by the conveyor mat transversely to the direction of movement upon exiting the bend. The lateral shearing forces on the teeth of the gear wheel can thereby be reduced. Such absorbing elements can comprise, for instance, a guide in the conveying track or next to the return wheel, cooperating with the inner side edge of the conveyor mat.

Elegantly, when the conveyor mat is provided with guiding elements reaching outward relative to the bottom surface, such as, for instance, bevels, positracks or other guiding cams, the supplementary transverse force absorbing element can be designed as a stop surface extending parallel to the gear wheel. Such a stop surface can be a side face of a rotatably or non-rotatably arranged smooth return element, for instance a side face of a cylindrical, smooth return wheel. Advantageously, the outer surface of such a cylindrical return element is provided with a circumferential slot in which the guiding elements can be received in rounding, so that the side faces of the guiding elements cooperate with a sidewall of the slot forming the stop surface. Such a grooved return element may be integrated with the gear wheel.

The invention also relates to a conveyor provided with a side-flexing mat, and to a drive gear for a conveyor. Further advantageous embodiments of the invention are represented in the subclaims.

The invention will be further elucidated on the basis of an exemplary embodiment which is represented in a drawing. In the drawing.

It is noted that the figures are merely schematic representations of a preferred embodiment of the invention, which is given here by way of non-limiting exemplary embodiment.

Figure 1:
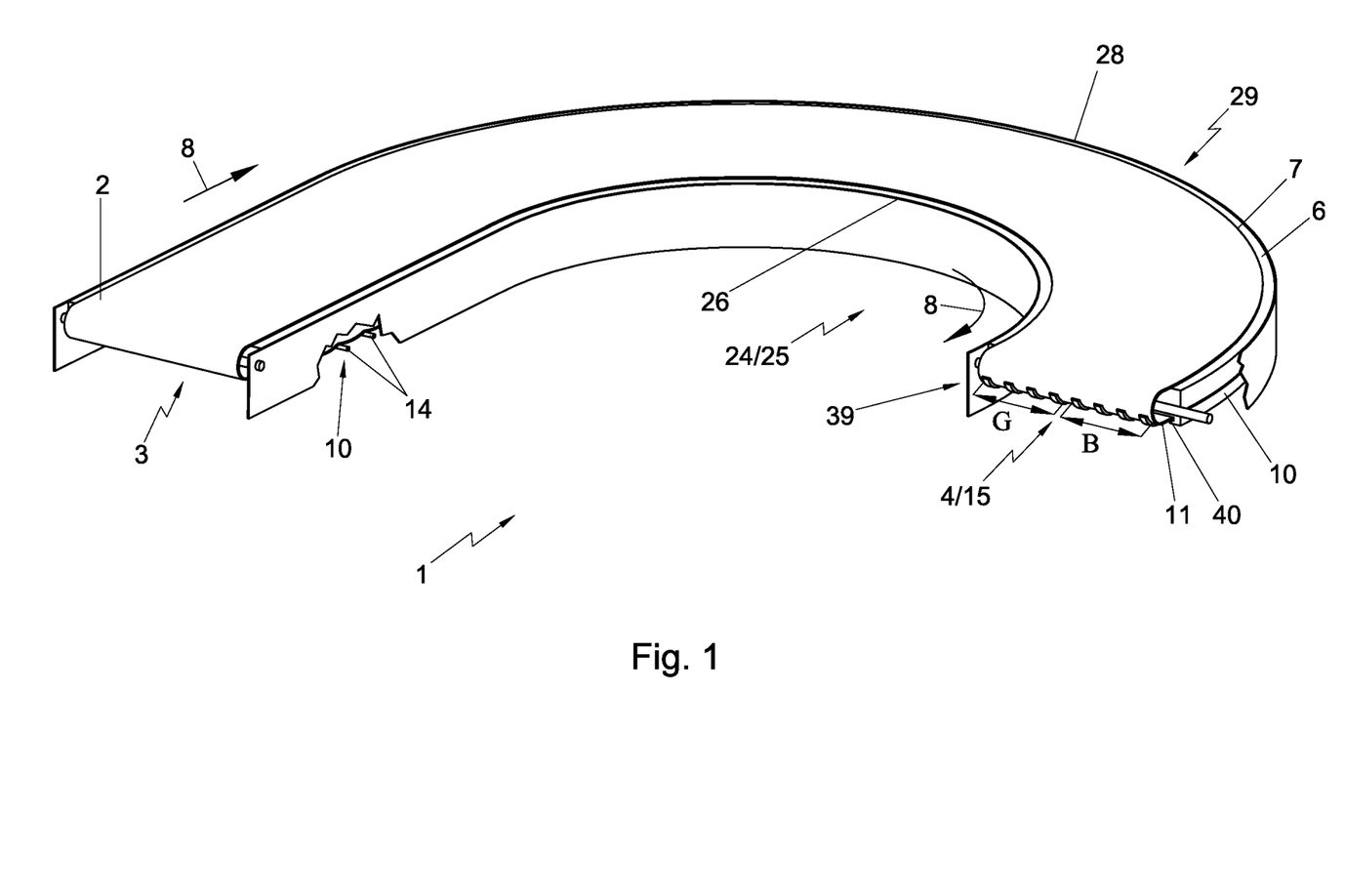
FIG. 1 shows a schematic perspective view of a conveyor with a modular side-flexing mat.
Figure 2:
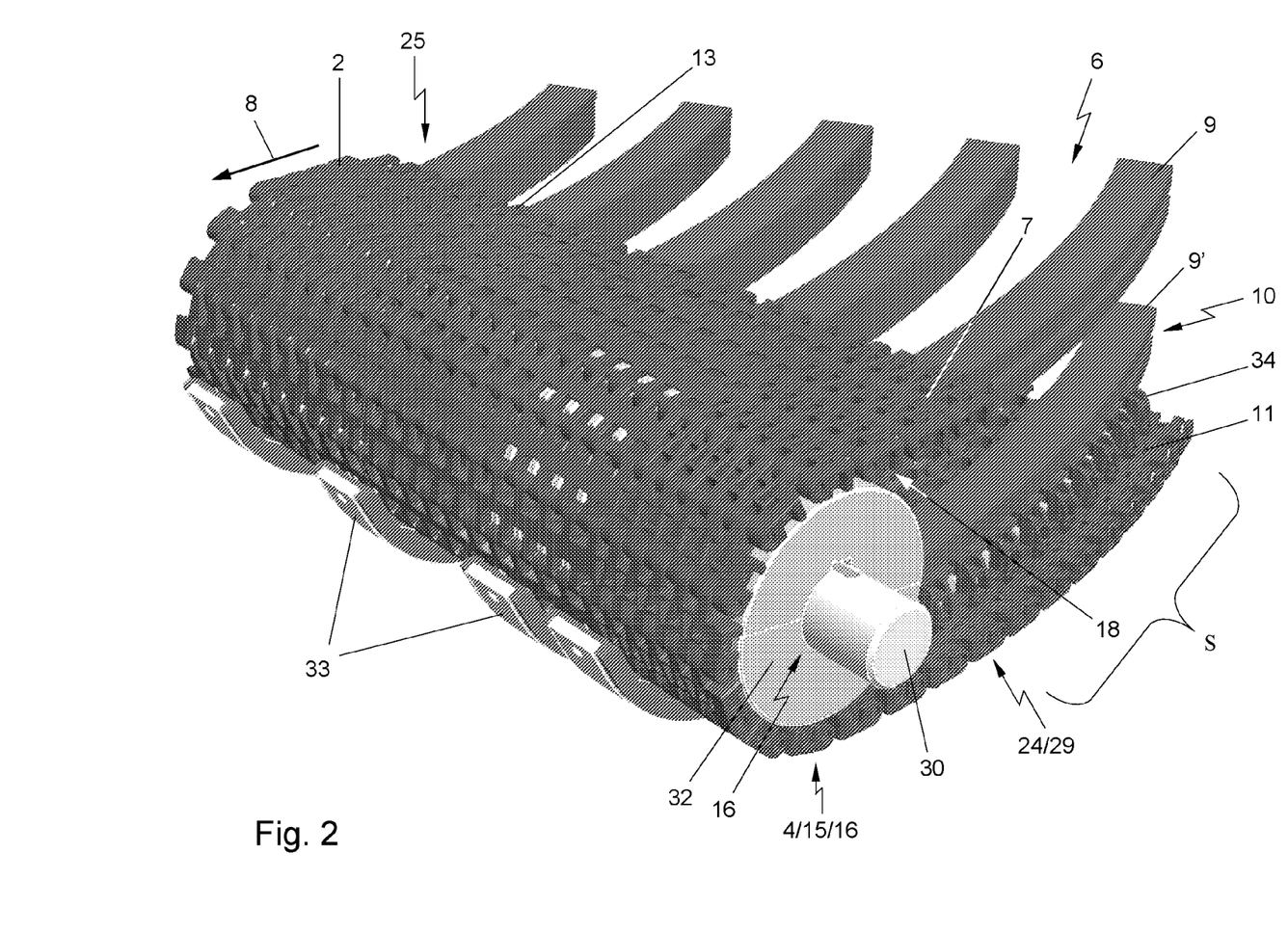
FIG. 2 shows a schematic perspective front view of an end drive of the conveyor of FIG. 1.
Figure 3:
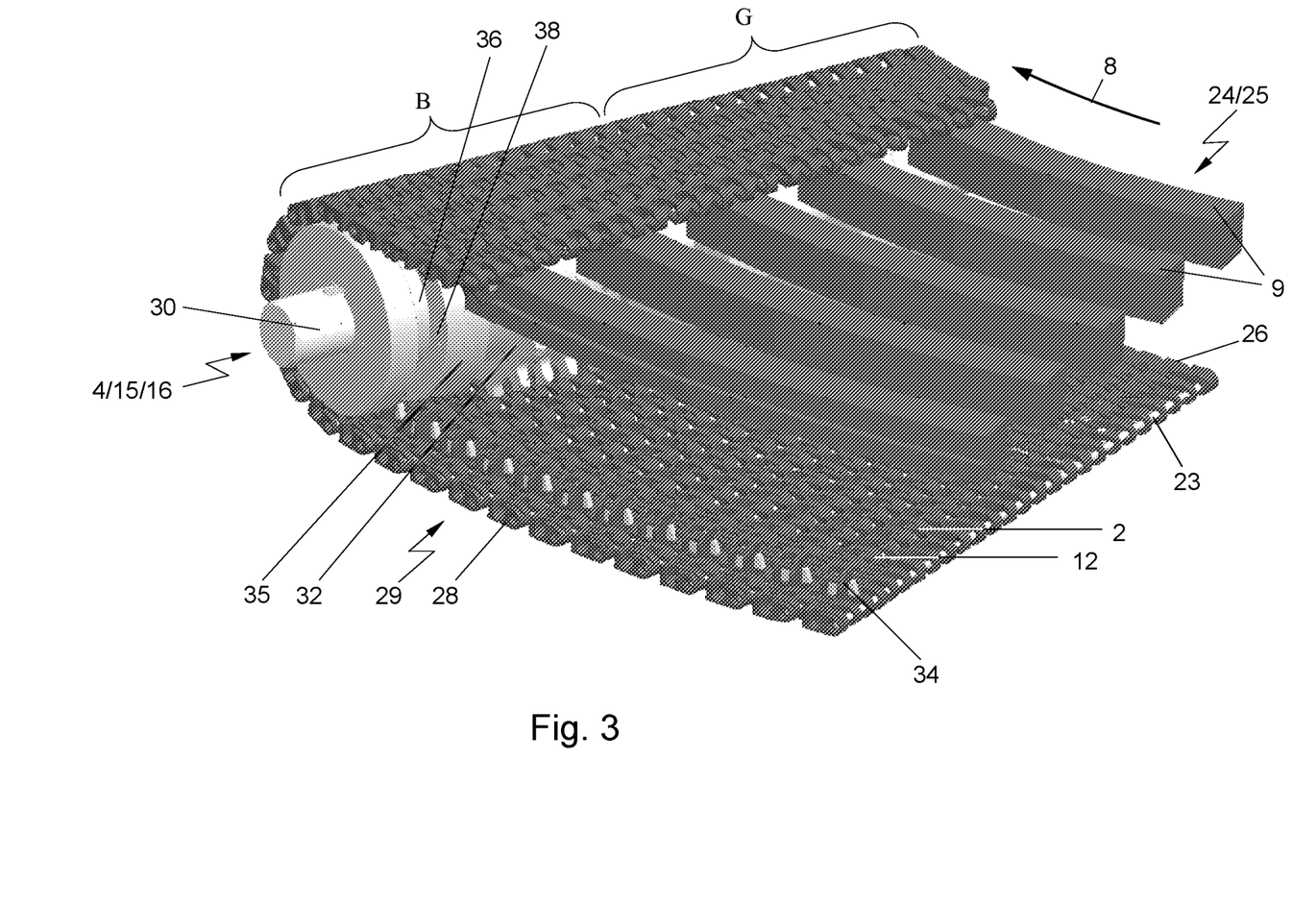
FIG. 3 shows a schematic perspective rear view of the end drive of FIG. 2 from the outside bend.
Figure 4:
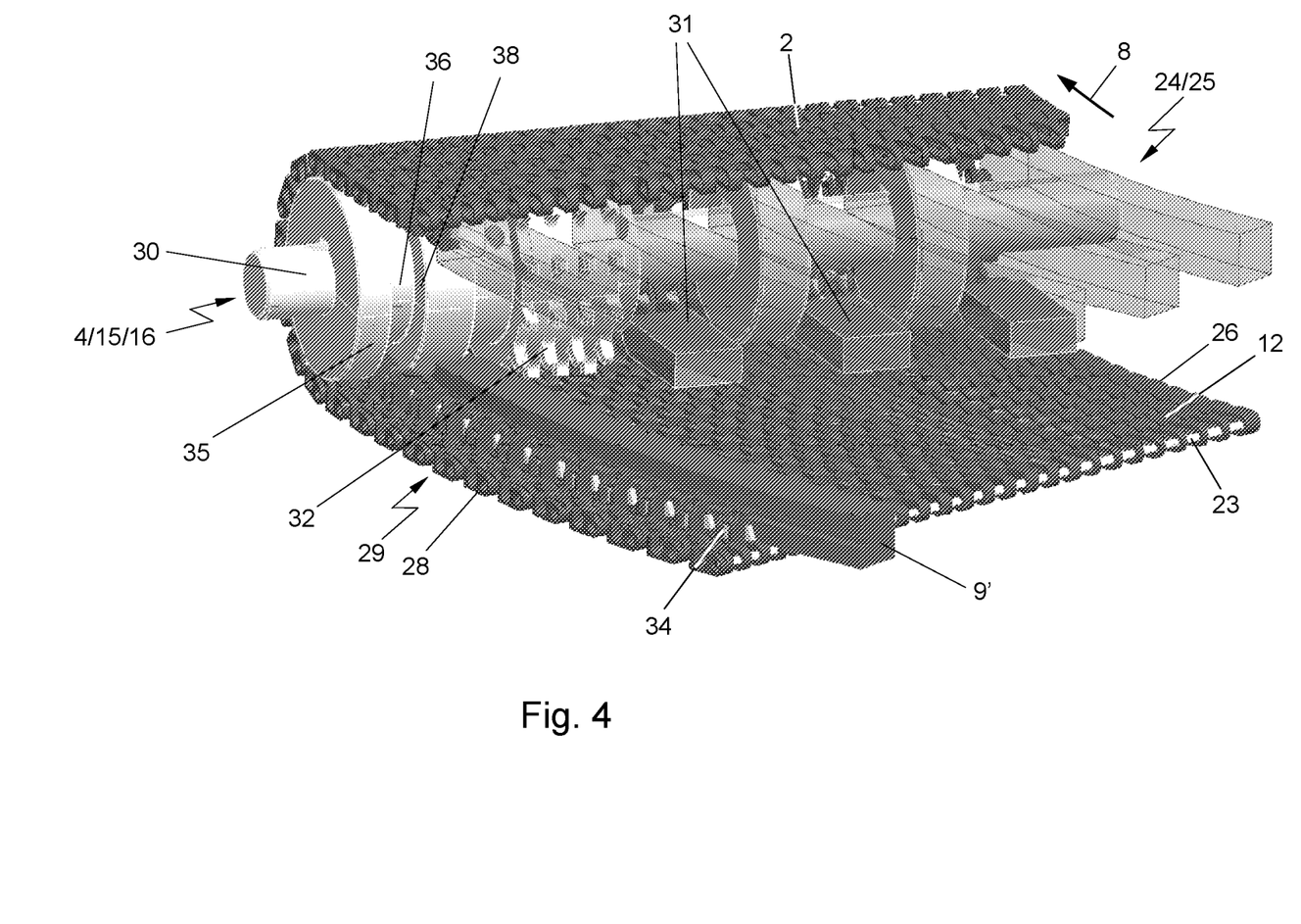
FIG. 4 shows a schematic perspective rear view of the end drive of FIG. 2 from the outside bend from a viewpoint located lower relative to FIG. 3, with the track guide in transparent view.
Figure 5:
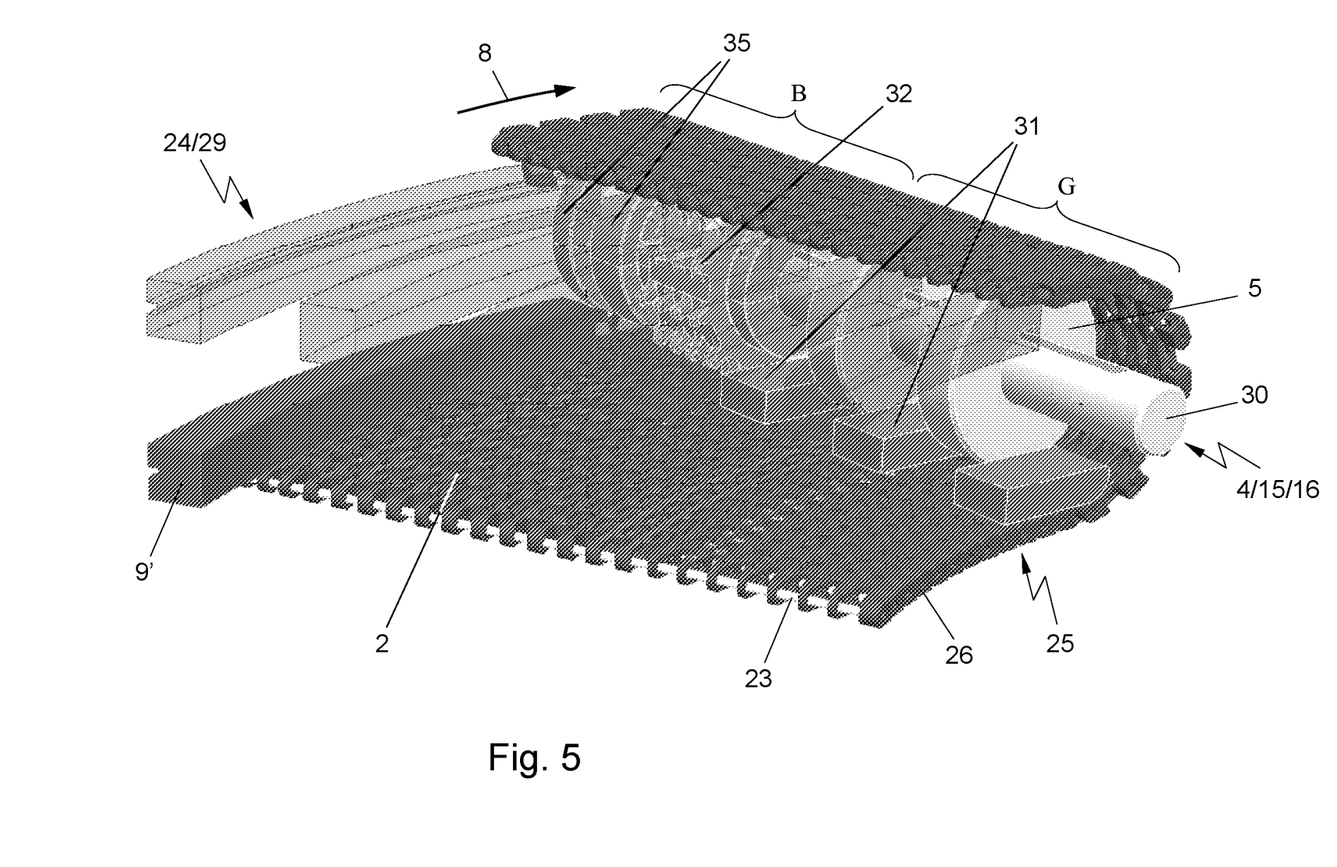
FIG. 5 shows a schematic perspective rear view of the end drive of FIG. 2 from the inside bend.
Figure 6:
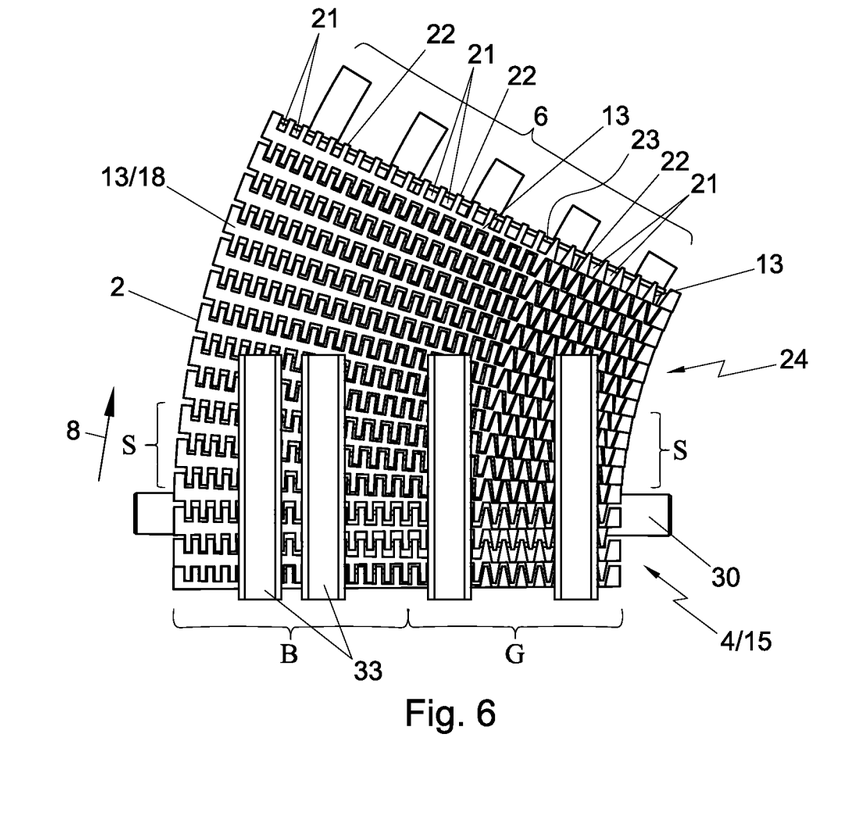
FIG. 6 shows a schematic bottom view of the end drive of FIG. 2.
Figure 7:
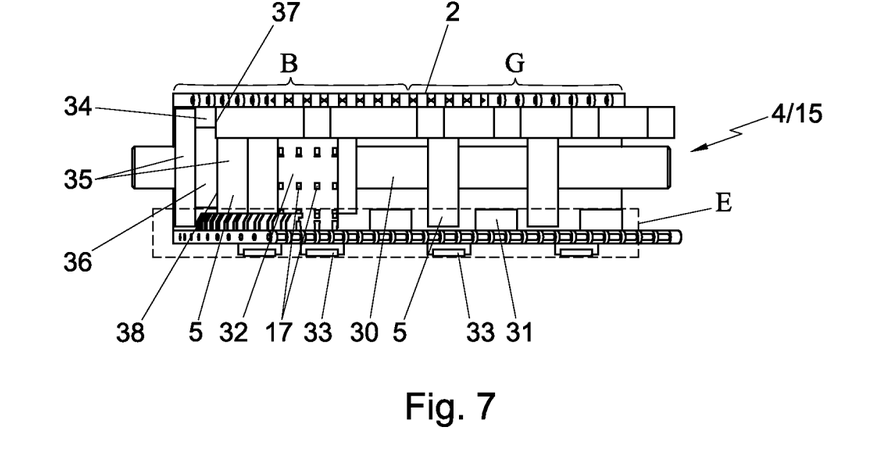
FIG. 7 shows a schematic front view of the end drive of FIG. 2, sectioned transversely to the direction of movement for a conveyor.
Figure 8:
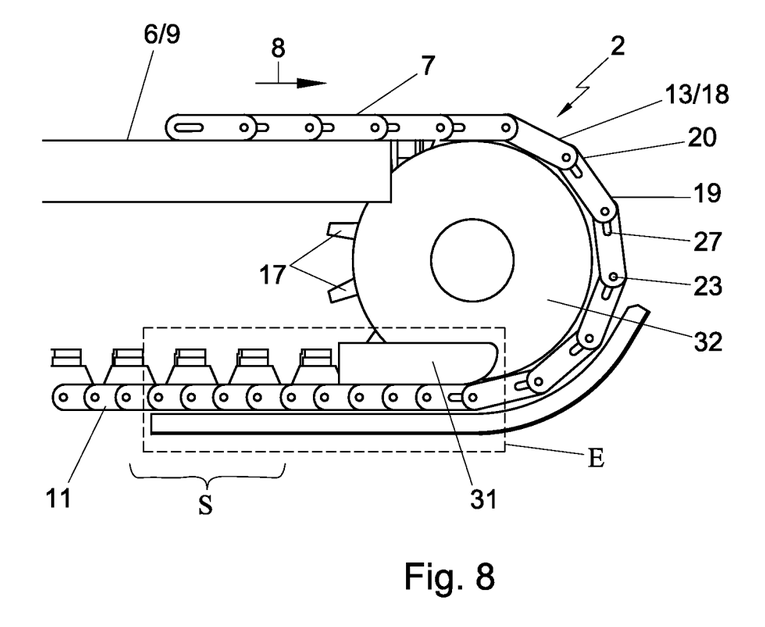
FIG. 8 shows a schematic side view of the end drive of FIG. 2, from the inside bend.
Figure 9:
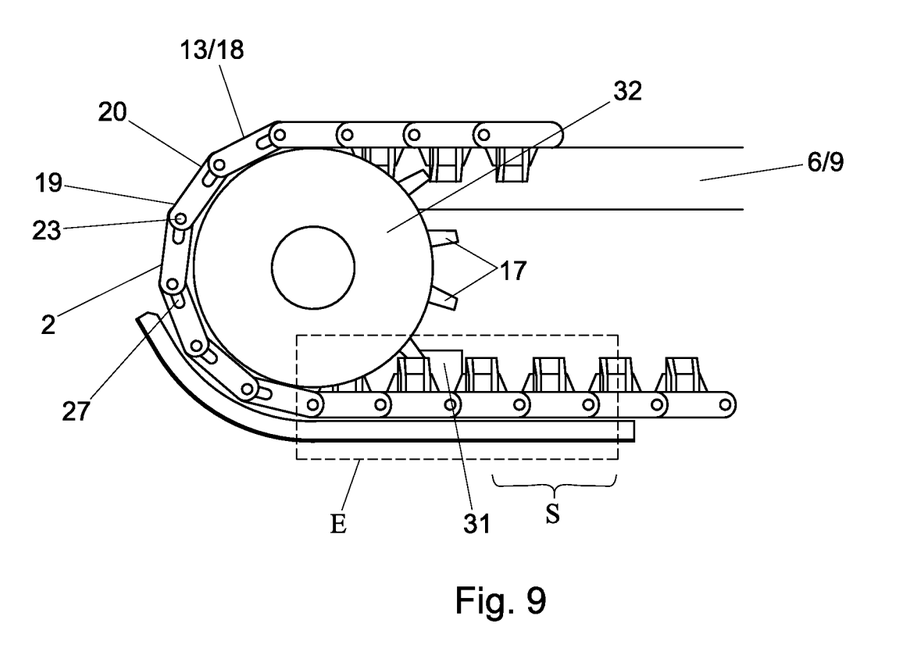
FIG. 9 shows a schematic side view of the end drive of FIG. 2 from the outside bend.

FIG. 1 shows a conveyor 1 with a modular conveyor mat 2. The conveyor mat 2 circulates in an endless loop between return elements 5 located at a beginning 3 and an end 4 of the conveyor 1. The conveyor 1 comprises a conveying track 6 for, during use, keeping flat and guiding a conveying part 7 of the conveyor mat 2. The conveying track 6 forms a substantially horizontal support surface for the conveying part 7 of the conveyor mat. On the conveying part 7, products can be conveyed in a direction of movement of the conveyor mat 2 indicated with an arrow 8. The support surface is built up from a series of wear resistant smooth strips 9 which cooperate with the bottom sides 12 of the modules 13 of the conveyor mat 2.

The conveyor 1 is further provided with a return guide 10 extending at a distance underneath the conveying part 7 for return guidance of a return part 11 of the conveyor mat 2. The return guide 10 comprises a series of guiding tubes 14 extending transversely to the direction of conveyance, spaced apart at mutual interspaces in the direction of movement 8 of the conveyor mat 2. The return guide 10 supports and guides the return part 11 in that the top sides 15 of the modules 13 of the conveyor mat 2 rest on the guiding tubes 14. The conveyor 1 is provided with an end drive 15 located at the end 3, which is shown in detail in FIGS. 2-9.

The end drive 15 comprises a drive unit, not represented, here an electric motor, which drives a gear drive 16 located between the conveying track 6 and the return guide 10. The gear drive comprises a rotatably disposed shaft 30 which bears the return elements 5. One of the return elements 5 is designed as a gear wheel 32 and comprises four toothed rings 17 which, through engagement, drivingly have the conveyor mat 2 go round from the conveying track 6 to the return guide 10.

The conveyor 1 has a conveying path with a bend segment 24 in the plane of the conveying track 6. The bend segment 24 links up with the end 4 of the conveyor 1 with the gear drive 16, where the conveyor mat 2 proceeds to round transversely to the plane of the conveying track 6.

The conveyor mat 2 is built up from rows 18 of modules 13 successive in the direction of movement 8. At their front and rear sides 19, 20, the modules 13 comprise coupling ends 22 spaced apart at mutual interspaces 21. The coupling ends 22 reach into the interspaces 21 of adjacent modules 13. The successive modules 13 are coupled with the aid of hinge pins 23 extending transversely to the direction of movement 8. The hinge pins 23 reach through hinge holes 27 provided in the coupling ends. In the direction of movement 8, the nominal pitch of the modules 13 is constant, for instance 2.54 cm (1 inch). In the straight-running part of the conveying path, the modules 13 are at their nominal pitch.

In this example, transversely to the direction of movement 8, several modules 13 are included next to each other in the rows 18. Also, the modules 13 of successive rows 18 are here staggered relative to each other, as in a brick laying pattern. It is noted that it is also possible to form rows 18 of the mat 2 with only one module 13, and to include the modules 13 in the conveyor mat 2 in a non staggered manner. In this example, the modules 13 are manufactured from plastic material, for instance PBT, Acetal or Nylon, but other materials are also possible. In this exemplary embodiment, the hinge pins 23 are made of another kind of plastic material, for instance PBT or PP, but other materials are also possible.

The conveyor mat 2 is configured as a so called modular side-flexing mat. In a side flexing mat, as shown here, successive modules 13 can pivot relative to each other in their planes by sliding with their coupling ends 22 at an angle into the interspaces 21. Upon passing through the bend 24, the pitch between successive modules 13 at the longitudinal side 26 of the conveyor mat 2 located at the inside bend 25 is reduced, so that the successive modules 13 and hinge pins 23 include an angle relative to each other. To facilitate sliding in and out, at least a part of the coupling ends 22 are equipped with slot-shaped hinge holes 27, also called slotted holes. As an alternative, coupling ends can also be provided with oversized hinge holes and/or undersized hinge pins can be provided. The conveying part 7 of the conveyor mat 2 is here guided through the bend at the location of the bend segment 24 in the conveying track 6, in that in the conveyor mat a number of modules 13 are provided at their bottom sides 12 with cam-shaped guiding elements 34, which cooperate by their side surfaces with side surfaces of the guiding strips 9, locally having a curved configuration. As an alternative, also other provisions can be made to guide the conveyor mat through the bend, for instance curved U-shaped guides 39, 40 which surround the longitudinal edges 26, 28 of the conveyor mat, or projections at the longitudinal edges of the conveyor mat which cooperate with a curved guide.

The specific design of the modules of the modular side-flexing mat is not relevant to the subject matter of this application. The modular side-flexing mat 2 shown in the exemplary embodiment is the Rexnord 1285, a combination of side-flexing modules 13 of different design. The mat shown comprises Rexnord 1255 center modules 13a with wide interspaces 21 and thickened ends on coupling ends 22, Rexnord 1265 reinforced edge modules 13b on the longitudinal edge 28 of the mat 2 at the outside bend 29, and Rexnord 1275 modules sliding in extra far on the longitudinal edge 26 of the mat 2 at the inside bend 25. The mat 2 can optionally be wholly constructed from Rexnord 1255 modules, so that the mat 2 can pivot both to the left and to the right. The mat 2 may alternatively be constructed from, for instance, Rexnord 505 modules, which have a V-shaped basic form of the coupling ends, or from side-flexing mat modules of other suppliers, such as Intralox.

Referring to FIGS. 2-9, there is shown an end drive for the conveyor of FIG. 1. The figures show the end drive 15, comprising a conveying track 6 for, during use, guiding a conveying part 7 of a modular conveyor mat 2 of the side-flexing type, a return guide 10 extending at a distance along the conveying part 7 for return guidance of a return part 11 of the conveyor mat 2, and a gear drive 16 located between the conveying track 6 and the return guide 10 for, through engagement of the conveyor mat 2, drivingly having the conveyor mat 2 go round from the conveying track 6 to the return guide 1. The conveying track 6 and the return guide 10 comprise a bend segment 24 where the conveying part 7 and the return part 10 of the conveyor mat 2, respectively, are guided in their planes through a bend.

In FIG. 2-9, it can be seen that the gear drive 16 drives the conveyor mat 2 only in an area G corresponding to the outer side of the bend segment 24. In this area G, successive modules 13 of the conveyor mat 2 are substantially pitched. The gear drive 16 leaves the conveyor mat free in an area B corresponding to the inner side of the bend segment 24. In the area G, successive modules 13 of the conveyor mat 2 are at least partly slid-in relative to their nominal pitch. It can further be seen that the return guide 10 of the end drive 15 comprises a guiding envelope E linking up with the gear drive 16 thereof and extending along successive rows 18 of modules 13. In the guiding envelope E, the movement of the return part 7 of the conveyor mat 2 both sideways in the plane of the conveyor mat 2 and upward and downward transversely to the plane of the conveyor mat 2 is limited. In the guiding envelope, the conveyor mat 2 is only free to move in the conveying direction 8. Successive modules 13 of the conveyor mat 2 are, both in the area B corresponding to the inner side of the bend 24 and in the area G corresponding to the outer side of the bend 24, slid into each other, without buckling of the mat, in a compression zone S.

The area G on the inner side of the conveying part 7, with this end drive 15, is not first pitched in a straight track section. The driving force is coupled in only in the area B on the outer side of the conveyor mat 2, in or near the mat portion where in the bend 24 the tensile force in the conveyor mat 2 is transmitted. With the aid of the guiding envelope E, the mat can be pushed back through the bend 24 without buckling. In this exemplary embodiment, the area B on the outer side of the bend 24 comprises the outer 40% of the mat width, and the area G on the inner side of the bend 24 then is the inner 60% of the mat width.

The guiding envelope E involves a wholly or partly curving zone of the return guide 10, extending from the gear wheel 32 into the bend 24, in which the conveyor mat 2 is confined sideways in the plane of the conveyor mat 2 and transversely to the plane of the conveyor mat 2. Transversely to the plane of the conveyor mat 2, the movement is limited to a clearance of a few millimeters. The longitudinal edges 26, 28 of the conveyor mat 2 are received with a clearance of a few millimeters in continuous U-shaped guiding channels 39, 40 curving in the direction of movement 8 of the conveyor mat 2. For easy reference, these guiding channels are only represented in FIG. 1. The bottom surface and the top surface of the conveyor mat 2 are supported by guides 31, 33 spaced apart at a mutual distance of, for instance, approximately 20 centimeters transversely to the direction of movement. The guides 31, 33 also extend in the direction of movement 8. The upper return guide 31 is here designed as a strip, and cooperates with the bottom surface of the conveyor mat 2, which faces up in the return guide 10. The upper return guide 31 then extends along the gear wheel 32 to near the '6 o'clock' position of the gear wheel. This upper return guide 31 counteracts the gear wheel 32 carrying along the conveyor mat 2 upwards. The lower return guide 33 cooperates with the top surface of the conveyor mat 2, which faces down in the return guide 10. The lower return guide 33 is here also of strip-shaped design. The lower return guide extends in the plane of the gear wheel 32 as far as the '6 o'clock' position, and runs from there along the circumference of the gear wheel 32, upwards as far as the '3 o'clock' position. In this exemplary embodiment, the guiding envelope E is thus formed by the upper return guide 31 which counteracts upward movement of the bottom surface of the mat, facing up in the return, the lower return guide 33 which counteracts downward movement of the top surface of the mat, facing down in the return, the guides 39, 40 shown in FIG. 1 which counteract lateral, upward and downward movement of the longitudinal edges 26, 28 of the mat, and the lower curved guiding strip 9' which, through cooperation with guiding elements 34, helps guide the mat through the bend 24. The guiding envelope ensures that the mat, as a result of the pushing force exerted on it, can only move in the direction of the track.

In the area corresponding to the inner side B of the bend 24, the end drive 15 is provided with non-engaging return elements 5. The non-engaging return elements 5 are designed as smooth, cylindrical return wheels 5 spaced apart on the driving shaft 30 transversely to the direction of movement 8 of the conveyor mat 2. With the smooth return wheels 5 the conveyor mat 2 is supported in rounding at the location of the non-driven part. The gear wheel 32 of the gear drive 16 comprises four toothed rings 17. The toothed rings 17 are spaced apart transversely to the direction of movement 8 of the mat 2. The distance between the toothed rings 17 corresponds to the distance between the interspaces 21 between the coupling ends 22 of the modules with which the gear wheel 32 cooperates. The teeth of adjacent toothed rings 17 are provided at the same angular positions, and their interspaces along the circumference of the gear wheel 32 correspond to the nominal pitch of the modules 13. The teeth here reach into the interspaces and cooperate by their teeth flanks with end faces of the coupling ends 22. As an alternative, for instance, the teeth may also engage in drive pockets in the undersides of the modules, or engage the hinge pins.

The conveyor mat 2 is provided with cam-shaped guiding elements 34 reaching outward relative to the bottom surface. In this example, the gear wheel 32 comprises an integrated, smooth, cylindrical return element. The outer surface 35 of the return element is provided with a circumferential slot 36. In this slot 36, the guiding elements 34 are received in rounding. Side faces 37 of the guiding elements 34 then cooperate with a sidewall 38 of the slot 36. The sidewall 38 of the slot 36 forms a supplementary transverse force absorbing element, with which increased transverse force on the teeth of the gear wheel, resulting from the rounding of the conveyor mat 2 in or at the end of the bend segment 16, is reduced.

As for the purport of this disclosure, it is pointed out that technical features which have been specifically described may be susceptible of functional generalization. It is further pointed out that—insofar as not explicitly mentioned—such technical features can be considered separately from the context of the given exemplary embodiment, and can further be considered separately from the technical features with which they cooperate in the context of the example.

As for the scope of protection, it is pointed out that the invention is not limited to the exemplary embodiment represented here, and that many variants are possible. For instance, in the gear drive, several return elements provided with toothed rings can be utilized, which may or may not be provided with several toothed rings. The end drive may comprise, for instance, two or more toothed rings which are spaced apart transversely to the direction of movement at the intermediate distance of the interspaces in the module, with the toothed rings arranged on juxtaposed gear wheels. Further, parts of the conveying path can be ascending or descending, and the return can optionally be located above the conveying part. Also, it is possible that the conveying part of the conveyor mat in rounding is guided from the conveying track to the gear drive via one or more guiding rollers, for instance one or more guiding rollers of relatively small diameter extending over the width of the mat, which are disposed, with their rotation axis parallel to the driving shaft of the gear drive, between the gear drive and the conveying track. Such a set-up has as an advantage that the conveyor adjacent the guiding roller can link up with a follow-up conveying apparatus and, owing to the relatively small diameter of the guiding roller, can link up with the follow-up conveying apparatus relatively closely. Such variants will be clear to the skilled person, and are understood to be within the scope of the invention as set forth in the following claims.

LIST OF REFERENCE NUMERALS

1. Conveyor
2. Conveyor mat
3. Beginning
4. End
5. Return element
6. Conveying track
7. Conveying part
8. Arrow
9. Strips
9'. Lower curved guiding strip
10. Return guide
11. Return part
12. Bottom side module
13. Module
14. Guide tubes
15. End drive
16. Gear drive
17. Toothed ring
18. Row
19. Front side
20. Rear side
21. Interspace
22. Coupling end
23. Hinge pin
24. Bend segment
25. Inside bend
26. Longitudinal edge inside bend
27. Hinge hole
28. Longitudinal edge outside bend
29. Outside bend
30. Shaft
31. Upper guide
32. Gear wheel
33. Lower guide
34. Guiding elements
35. Outer surface
36. Slot
37. Side face guiding element
38. Sidewall slot
39. Guiding channel
40. Guiding channel
B. Area corresponding to the outside bend
E. Guiding envelope
G. Area corresponding to the inside bend
S. Compression zone

The invention claimed is:

1. An end drive for a conveyor, said end drive comprising:
a conveying track guiding a conveying part of a modular conveyor mat, said conveying track defining a bend segment having an inner side and an outer side;
a return guide extending at a distance along the conveying part for return guidance of a return part of the conveyor mat: and
a gear drive located between the conveying track and the return guide driving said conveyor mat through said conveying track and return guide wherein the gear drive drives the conveyor mat only in an area corresponding to the outer side of the bend segment where successive modules of the conveyor mat are substantially at pitch, and leaves the conveyor mat free in an area corresponding to the inner side of the bend segment where successive modules of the conveyor mat are at least partly slid into each other, and that the return guide comprises a guiding envelope, linking up with the gear drive and extending along successive rows of modules, in which movement of the return part of the conveyor mat both sideways in the plane of the conveyor mat and transversely to the conveying plane is limited.

2. An end drive according to claim 1, wherein the guiding envelope comprises a compression zone in which, during use, successive modules of the conveyor mat, both in an area corresponding to the inner side of the bend and in the area on the outer side of the bend, are slid into each other in a compression zone without buckling of the mat.

3. An end drive according to claim 1, wherein the guiding envelope comprises U-shaped guiding channels of curved configuration in which during use longitudinal edges of the conveyor mat are received.

4. An end drive according to claims 1, wherein the guiding envelope comprises upper and lower guides, spaced apart transversely to the conveying direction, extending in the direction of movement of the conveyor mat, between which, during use, the conveyor mat is received with a few millimeters of clearance.

5. An end drive according to claim 4, wherein the lower guides are located in a plane of a return element.

6. An end drive according to claim 4, wherein the upper guides are located next to a return element.

7. An end drive according to claim 1, wherein the gear drive comprises several adjacent toothed rings.

8. An end drive according to claim 7, wherein the toothed rings are spaced apart transversely to the direction of movement of the conveyor mat at an intermediate distance corresponding to the interspaces between the coupling ends.

9. An end drive according to claim 7, wherein three or more toothed rings are arranged on a common return element which forms a gear wheel.

10. An end drive according to claims 9, wherein a smooth cylindrical return element is integrated with the gear wheel.

11. An end drive according to claim 1, wherein one or more non-engaging return elements are provided on the inner side of said bend segment.

12. An end drive according to claim 1, comprising a smooth, cylindrical return element whose outer surface is provided with a circumferential slot in which guiding elements of the conveyor mat can be received during rounding.

13. A conveyor, comprising:
a modular side-flexing conveyor mat circulating in an endless loop between return elements located at a beginning and an end of the conveyor,
a conveying track holding flat and guiding a conveying part of the conveyor mat,
a return guide extending at a distance underneath the conveying part for return guidance of a return part of the conveyor mat, and
an end drive according to claim 1 located at the end of the conveyor between the conveying track and the return guide.

14. A gear wheel for an end drive according to claim 1, comprising a return element on which three or more toothed rings are arranged, which is integrated with a smooth, cylindrical return element whose outer surface is provided with a circumferential slot in which guiding elements of the conveyor mat can be received in rounding.

* * * * *